United States Patent
Kaeriyama

[11] Patent Number: 6,053,617
[45] Date of Patent: *Apr. 25, 2000

[54] MANUFACTURE METHOD FOR MICROMECHANICAL DEVICES

[75] Inventor: Toshiyuki Kaeriyama, Plano, Tex.

[73] Assignee: Texas Instruments Incorporated, Dallas, Tex.

[*] Notice: This patent is subject to a terminal disclaimer.

[21] Appl. No.: 08/311,480

[22] Filed: Sep. 23, 1994

[51] Int. Cl.[7] .................................................... G02B 7/182
[52] U.S. Cl. ........................ 359/872; 359/871; 359/291; 359/295; 359/224
[58] Field of Search .................................. 359/871, 872, 359/291, 295, 224; 216/2, 49, 58, 83; 156/653, 654, 655, 656

[56] References Cited

U.S. PATENT DOCUMENTS

| | | | |
|---|---|---|---|
| 4,293,377 | 10/1981 | Miyajima | 156/656 |
| 4,970,106 | 11/1990 | DiStefano et al. | 428/209 |
| 5,083,857 | 1/1992 | Hornbeck | 359/291 |
| 5,099,353 | 3/1992 | Hornbeck | 359/291 |
| 5,142,405 | 8/1992 | Hornbeck | 359/226 |
| 5,227,013 | 7/1993 | Kumar | 156/644 |
| 5,298,114 | 3/1994 | Takeshita | 156/643 |
| 5,447,600 | 9/1995 | Webb | 216/2 |

*Primary Examiner*—Cassandra Spyrou
*Assistant Examiner*—Mohammad Y. Sikder
*Attorney, Agent, or Firm*—Charles A. Brill; Wade James Brady III; Fredrick J. Telecky, Jr.

[57] ABSTRACT

A process for manufacturing micromechanical devices. The process includes the step of covering the activation circuitry (201) and those parts of the device that come in contact with moving parts with a pad film (202). The pad film prevents frictional wear and sticking of the moving parts, and can prevent electrical shorts between different parts of the activation circuitry. Additionally, the pad film can prevent particulates from interfering with the operation of the device.

4 Claims, 3 Drawing Sheets

6,053,617

MANUFACTURE METHOD FOR MICROMECHANICAL DEVICES

BACKGROUND OF THE INVENTION

1. Field of the Invention

This invention relates to an improved method for manufacturing micromechanical devices, more particularly to manufacturing these devices such that their moving parts do not stick together.

2. Background of the Invention

Micromechanical devices are very small devices such as motors, gears, light modulator cells, etc., that are manufactured out of a semiconductor substrate, typically by a repeated process of masking and etching. They are activated by circuitry implanted into, or laid down upon, the substrate. As electronics move towards more and more power in a smaller and smaller space, micromechanical devices become more important.

One problem with these devices is the wear and tear they undergo during operation. A typical silicon micromotor loses its rotor after only about ten thousand revolutions. The silicon just wears away. The erosion is caused by the rotor sticking to surrounding structures, including its own axle, as it revolves, eating away the silicon. Another problem can occur when, instead of the rotor being worn away, it just sticks such that it will no longer move. Various methods of laying down protective layers exist, but each have their problems.

Some manufacturing processes use a deposited film on the devices after they are complete. Others try to work the layer into the existing process, requiring expensive and non-standard processing. Obviously, some method of preventing these devices from sticking together is needed.

An additional problem with micromechanical devices is the size of the activation circuitry. For example, micromechanical light modulators, such as the digital micromirror device, sometimes require activation circuitry of four electrodes for each $17\mu^2$ mirror. The mirror is suspended above its electrodes by hinges which in turn are supported by post. Using the axis of the hinges as the center line of the mirror, each mirror has two electrodes on either side of its center line, directly under the mirror on the substrate. One electrode on each side is the addressing electrode, the other is the landing electrode, with the addressing electrodes adjacent to the center.

The landing electrodes and the mirror are held at the same bias voltage, preventing shorts or current flow when the mirrors touch their landing electrodes. In order to cause the mirror to deflect and touch the landing electrode, the address electrodes are set at a different bias. Because the area on the substrate within which these electrodes must reside is so close, it is relatively common for a particle to rest such that it touches both the landing electrodes and the address electrodes. Since they are held at different voltage levels, this can cause shorts in the activation circuitry of the modulator, rendering it unusable. Other micromechanical devices can suffer from these same problems, whenever the driving circuitry is close enough to allow particles or debris to cause shorts.

Therefore, a method is needed that allows micromechanical devices to run for longer period of time without sticking together, thereby causing wear. Additionally, it would be beneficial if the method preventing particulates and debris from damaging the circuitry which activates the micromechanical devices.

SUMMARY OF THE INVENTION

The described embodiments of the invention is a method for manufacturing micromechanical devices. The method includes the step of forming a pad film upon the activation circuitry and those structures that contact the moving parts of micromechanical devices. The film upon the activation circuitry acts as both a protective coating against particulates and an insulator between oppositely biased circuit paths. The film upon those structures of the device that contact the moving parts prevents wear and sticking of the moving parts. It is an advantage of the invention that it can be added to the existing manufacturing process with relative ease and no substantial increase in cost.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Figure 1:
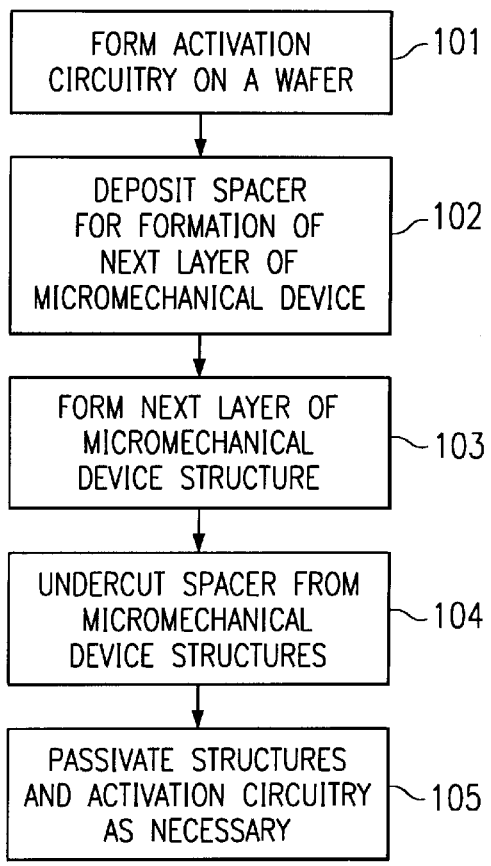
FIG. 1 is a prior art flow chart for the manufacture of a micromechanical device.

FIG. 1 shows an example of a prior art process for manufacturing a micromechanical device, specifically the digital micromirror device (DMD). Many other types of micromechanical devices can be manufactured using similar techniques. However, due to the unique nature and the high amount of contact between the parts, DMDs could represent the worst case for both particulates and for sticking parts.

In step 101, the activation circuitry is formed on a wafer. Most of the processing will be performed at the wafer level. The activation circuitry could be implanted, deposited or otherwise formed on the circuitry. This circuitry might include address lines for an array of elements, voltage lines for motors, etc. For the DMD, the activation circuitry typically includes address lines in CMOS and a metal layer of electrodes.

The structure of the micromechanical device is begun in step 102. Vias are cut into the surface of the spacer for DMDs to make holes for posts, normally by an etching process. However, for other devices, such as micromotors, a silicon axle or rotor may be formed first, either by etching the silicon away from the rotor, or depositing more silicon. At some step in the process, however, some sort of spacer layer must be used to facilitate the manufacture of the moving parts.

For the DMD, the spacer will be patterned and etched to form vias. These vias will be filled with metal in step 103, which is the next layer of the device. The metal filled holes become support posts upon which the hinges will be formed to hold the mirrors. The next step within step 103 for the DMD is to pattern the metal layer holding the posts and removing the metal not used for the posts. A second layer of metal is deposited to form the hinges, and a final layer deposited to form the mirror itself (also known as the reflective surface or the beam).

At this point the mirror is complete with hinges and posts. Holes are patterned into the mirror to allow access to the spacer. The mirror still rests upon the spacer layer deposited in step 102. In DMD fabrication, this is typically removed using a plasma etch, leaving the mirror suspended over an air gap that allows the mirror to deflect freely from side to side.

In step the surfaces are passivated with a material that prevents sticking and frictional wear of the moving surfaces. However, it is becoming apparent that this passivation in and of itself is not enough. These devices are typically used in high resolution televisions and printers. When an individual mirror sticks to the electrodes, or does not have operable addressing circuitry because of a short, the picture suffers from pixel defects where the pixels in the picture are either white or black all of the time.

Figure 2:
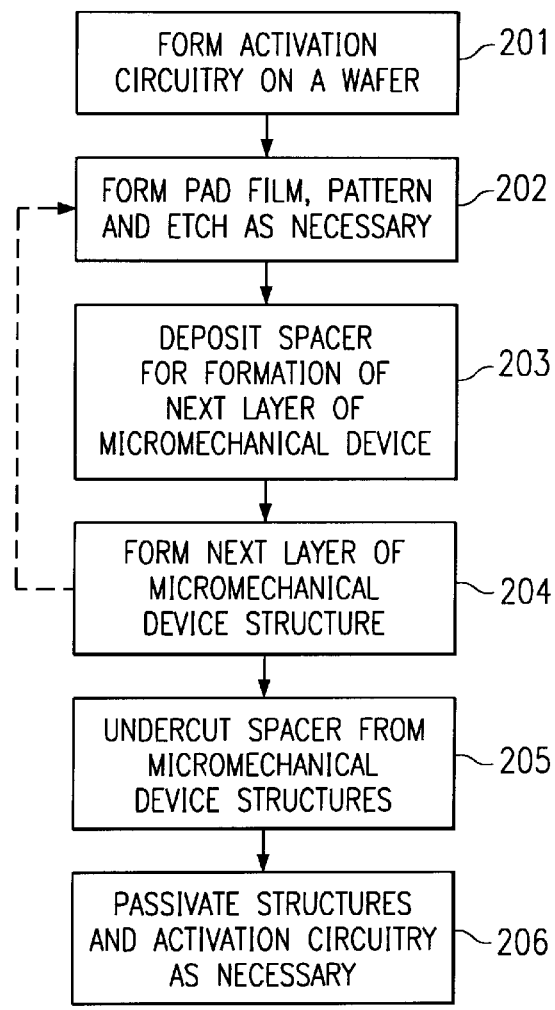
FIG. 2 is a flow chart of a process that includes a protective coating.
Figure 3A:
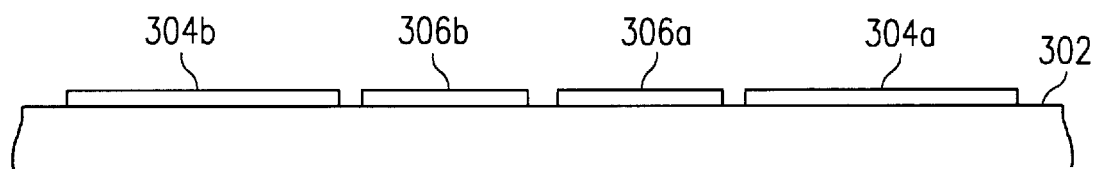
FIG. 3 shows a substrate as it goes through the various steps of a micromechanical device manufacturing process including a protective coating.
Figure 3B:
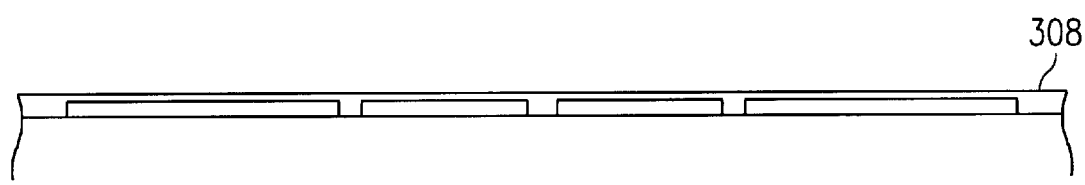
Figure 3C:
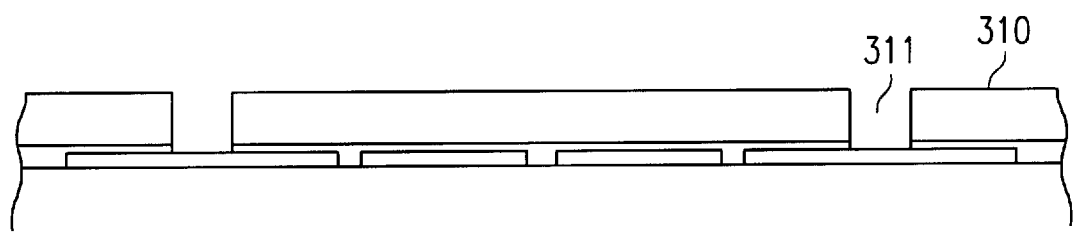
Figure 3D:
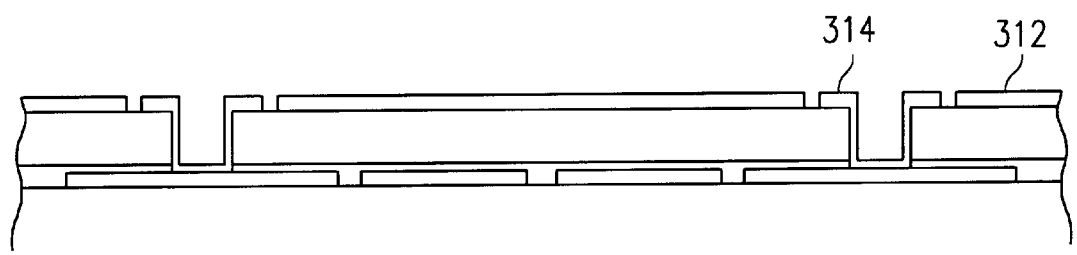
Figure 3E:
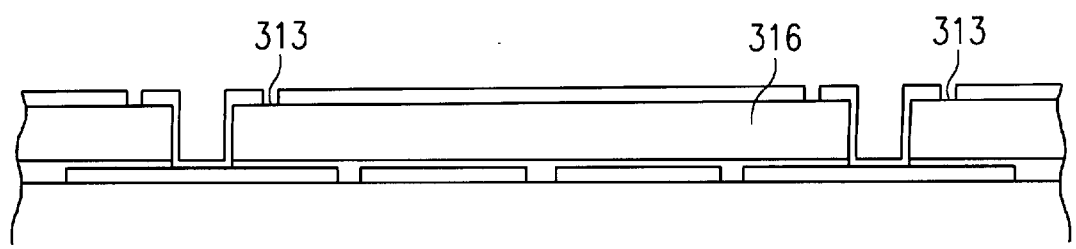
Figure 4A:
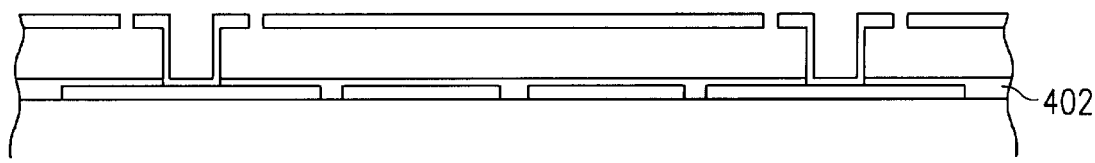
FIG. 4 shows different possibilities for the placement of a protective coating relative to the activation circuitry of a micromechanical device.
Figure 4B:
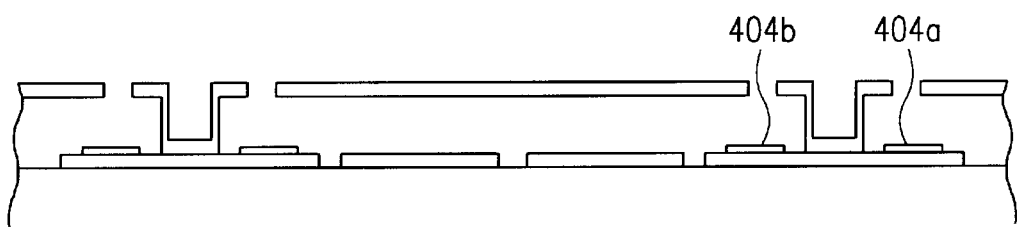
Figure 4C:
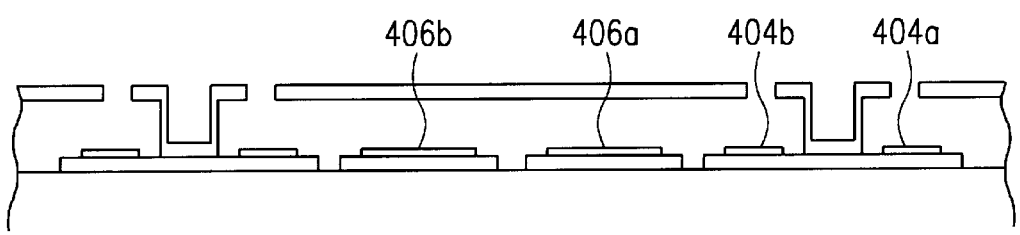
Figure 4D:
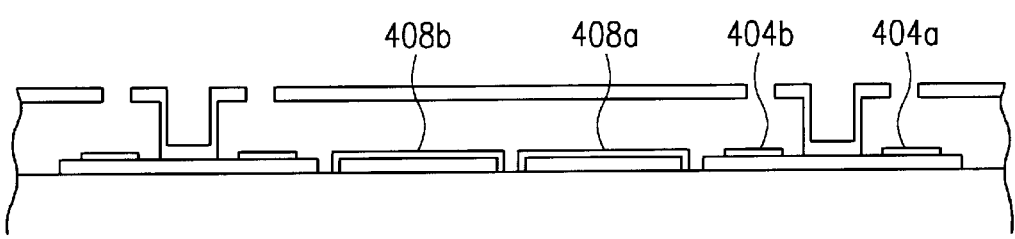

FIG. 2 shows one embodiment of the invention. This embodiment is a method of manufacture for micromechanical devices. After the activation circuitry is formed upon the wafer It is coated with a pad film, which is then patterned and etched as necessary. A pad film merely comprises a thin layer of material formed into a cushion. This protects the activation circuitry from particulate matter and prevents shorts. Additionally, if the activation circuitry or any underlying circuitry makes contact with any of the moving parts of the device, this will prevent frictional wear and sticking of the parts.

The process continues through steps 203 and 204. After step 204, any moving parts formed In the later steps of the process, such as a rotor or flywheel, or the non-moving parts that come in contact with the moving parts, could also be coated with a pad film. Again, this prevents sticking and frictional wear of the parts.

The composition of the pad film is only limited by the processes in which it is deposited and etched. However, desirable properties of this film are: low surface tension; temperature stability up to 110° C.; high abrasion resistance; high humidity resistance; and high surface stability. An example, which is in no way intended to limit the scope of the range of these materials, of such a material is a fluoropolymer. Additionally, the material could be other organic materials, such as other polymers, or inorganic material such as a nitride or oxide.

In tests of this type of material in such a process the following results were achieved:

|  | Number of defective mirrors | | | |
| --- | --- | --- | --- | --- |
| Device | 1 hour | 69 hours | 391 hours | 716 hours |
| Conventional | 0 | 30 | 56 | 136 |
| With pad film | 0 | 11 | 12 | 30 |

A step by step development of the structure of a device with a pad film is shown in FIG. 3. The wafer 302 has formed upon it landing electrodes 304a and 304b, and address electrodes 306a and 306b. The pad film 308 is deposited, most likely by a planarized spin coat for flatness, over these electrodes. The landing electrodes 304 and address electrodes 306 are at different biases and the pad film can prevent particulate matter from making contact between them, causing shorts.

The spacer layer 310 is deposited and etched to form the structure over which a metal layer will be deposited. The spacer is patterned and etched to form the post via 311, which will be filled in with first metal layer. When the metal is deposited, it is patterned and etched to form the post 314. The mirror 312 and hinges 313 are formed from a second metal layer deposited after patterning the first metal layer. When the spacer is removed in the final step, air gap 316 is left, allowing the mirror to move freely and deflect to land upon either landing electrode. Note that the post for the mirror shown in the final step would be positioned directly in front of the mirror between the viewer and the mirror.

FIG. 4 shows variations on the placement of the pad film depending upon the requirements of the process and the devices to be fabricated. The pad film 402, since it is electrically insulative, could be formed over the entire activation circuitry. Depending upon the flexibility of the process, it could also be patterned and etched to form only pads at the points of contact between the mirror and the landing electrodes, 404a and 404b. Additionally, to allow for better insulation, it could be formed over the landing electrodes 404a and 404b, and over the addressing electrodes at 406a and 406b. For particulate insulation the film could be left over the addressing electrodes as in 408a and 408b, with just the pads on the landing electrodes 404a and 404b. Of course, combinations of any of the above could be used as needed by the device or the process.

As discussed previously, the digital micromirror device could represent the worst case for a micromechanical device. It has oppositely biased voltages within extremely close proximity to each other and high surface area contact points between the moving and non-moving parts of the device, which come into contact repeatedly. The use of the DMD as an example is in no way intended to limit the application of this pad film. Its usefulness applies across the range of micromechanical devices for insulation and particulate prevention, in addition to preventing frictional wear and sticking of moving parts.

Thus, although there has been described to this point particular embodiments of a process and device using a pad film, it is not intended that such specific references be considered as limitations upon the scope of this invention except in-so-far as set forth in the following claims.

What is claimed is:

1. A method for forming a micromechanical device wherein said method includes the step of forming an inorganic pad film over activation circuitry having a first bias and any moving parts of the device having a second bias, which contact other surfaces subjecting said parts to sticking or friction, wherein said pad film acts as an insulator between said activation circuitry and said moving parts.

2. The method of claim 1 wherein said inorganic material is a nitride.

3. The method of claim 1 wherein said inorganic material is an oxide.

4. The method of claim 1 wherein said micromechanical device is a digital micromirror device.

* * * * *